United States Patent
Wang et al.

(10) Patent No.: US 11,082,388 B2
(45) Date of Patent: Aug. 3, 2021

(54) APPARATUS AND METHOD FOR PROVIDING CONNECTIONS TO CONTACTS BASED ON ASSOCIATIONS WITH CONTENT

(71) Applicant: Nokia Technologies Oy, Espoo (FI)

(72) Inventors: Danlin Wang, Beijing (CN); Hongrui Shen, Beijing (CN); Naichen Cui, Beijing (CN); Chengyu Huang, Beijing (CN)

(73) Assignee: Nokia Technologies Oy, Espoo (FI)

(*) Notice: Subject to any disclaimer, the term of this patent is extended or adjusted under 35 U.S.C. 154(b) by 106 days.

(21) Appl. No.: 14/901,315

(22) PCT Filed: Jul. 2, 2013

(86) PCT No.: PCT/CN2013/078695
§ 371 (c)(1),
(2) Date: Dec. 28, 2015

(87) PCT Pub. No.: WO2015/000138
PCT Pub. Date: Jan. 8, 2015

(65) Prior Publication Data
US 2016/0205057 A1    Jul. 14, 2016

(51) Int. Cl.
*H04L 12/58* (2006.01)
*H04L 29/08* (2006.01)
(Continued)

(52) U.S. Cl.
CPC ............ *H04L 51/32* (2013.01); *G06Q 10/10* (2013.01); *G06Q 30/0277* (2013.01);
(Continued)

(58) Field of Classification Search
CPC ....... H04L 51/32; H04L 67/306; H04L 51/10; G06Q 10/10; G06Q 50/01; G06Q 30/0277
(Continued)

(56) References Cited

U.S. PATENT DOCUMENTS 8,762,462 B1 * 6/2014 Duddu .................... H04L 51/18
709/204
2001/0032095 A1   10/2001 Balbach
(Continued)

FOREIGN PATENT DOCUMENTS

CN         1932809 A       3/2007
CN       101515270 A       8/2009
(Continued)

OTHER PUBLICATIONS

International Search Report and Written Opinion received for corresponding Patent Cooperation Treaty Application No. PCT/CN2013/078695, dated Mar. 17, 2014, 13 pages.
(Continued)

*Primary Examiner* — John B Walsh
*Assistant Examiner* — Weiwei Y Stiltner
(74) *Attorney, Agent, or Firm* — Mintz Levin Cohn Ferris Glovsky and Popeo, P.C.

(57) ABSTRACT

Mechanisms are described for determining a contact associated with keywords of content presented to a user and for enabling communication with the contact via the same user interface via which the content is presented. At least one keyword is identified relating to content presented to the user via the user interface, and a contact is determined that is associated with the keyword identified. A communication is then caused to be exchanged between the user and the contact determined in response to receipt of a communication input provided by the user. The communication input is
(Continued)

received via the user interface presenting the content. In this way, a user can make quick connections to contacts for sharing information in the process of consuming content based on an analysis of keywords from the content.

15 Claims, 8 Drawing Sheets

(51) Int. Cl.
  *G06Q 30/02* (2012.01)
  *G06Q 50/00* (2012.01)
  *G06Q 10/10* (2012.01)
(52) U.S. Cl.
  CPC ............. *G06Q 50/01* (2013.01); *H04L 51/10* (2013.01); *H04L 67/306* (2013.01)
(58) Field of Classification Search
  USPC ........................................................ 709/206
  See application file for complete search history.

(56) References Cited

U.S. PATENT DOCUMENTS

| | | | |
|---|---|---|---|
| 2002/0019825 A1 | 2/2002 | Smiga et al. | |
| 2007/0106931 A1 | 5/2007 | Vartiainen et al. | |
| 2008/0195659 A1 | 8/2008 | Rawle | |
| 2009/0005089 A1* | 1/2009 | Paik | H04L 51/04 455/466 |
| 2010/0070899 A1* | 3/2010 | Hunt | G06F 3/0486 715/769 |
| 2011/0078265 A1 | 3/2011 | Yach | |
| 2011/0225539 A1 | 9/2011 | Won | |
| 2011/0314418 A1 | 12/2011 | Kotler et al. | |
| 2012/0179573 A1* | 7/2012 | Falcone | G06Q 30/0601 705/26.8 |
| 2012/0260188 A1* | 10/2012 | Park | G06Q 10/107 715/739 |
| 2013/0043302 A1 | 2/2013 | Powlen | |
| 2013/0117383 A1 | 5/2013 | Hymel | |
| 2013/0166657 A1* | 6/2013 | Tadayon | H04M 1/72552 709/206 |
| 2013/0254309 A1* | 9/2013 | Jackson | H04L 51/20 709/206 |
| 2014/0108562 A1* | 4/2014 | Panzer | G06Q 10/10 709/206 |
| 2014/0143646 A1* | 5/2014 | Branton | G06F 16/972 715/234 |
| 2014/0156743 A1* | 6/2014 | Veda | G06Q 10/10 709/204 |
| 2014/0164088 A1* | 6/2014 | Rorabaugh | G06Q 30/0226 705/14.27 |
| 2014/0181219 A1* | 6/2014 | Wang | G06F 9/453 709/206 |
| 2014/0248894 A1* | 9/2014 | Kawasaki | H04W 72/10 455/452.1 |
| 2014/0258420 A1* | 9/2014 | Dent | H04L 51/14 709/206 |
| 2014/0372885 A1* | 12/2014 | Jayaram | G06Q 10/10 715/705 |

FOREIGN PATENT DOCUMENTS

| | | |
|---|---|---|
| CN | 101883166 A | 11/2010 |
| CN | 101883166 A | 11/2010 |
| CN | 102638420 A | 8/2012 |
| EP | 3017384 A1 | 5/2016 |

OTHER PUBLICATIONS

Extended European Search Report received for corresponding European Patent Application No. 13888838.3, dated Feb. 10, 2017, 6 pages.
Jan. 11, 2018 (EP) European Office Action—App 13888838.3.
Jun. 6, 2018—(EP) Office Action—App 13888838.3.
Aug. 8, 2018—(CN) First Office Action—App 201380077995.5.
Jan. 9, 2018—(PH) Examination Report—App 1/2016/500020.

* cited by examiner

APPARATUS AND METHOD FOR PROVIDING CONNECTIONS TO CONTACTS BASED ON ASSOCIATIONS WITH CONTENT

RELATED APPLICATION

This application was originally filed as Patent Cooperation Treaty Application No. PCT/CN2013/078695 filed Jul. 2, 2013.

TECHNOLOGICAL FIELD

Example embodiments of the present invention relate generally to providing for communications (e.g., email, text messages, phone calls, social media messages, voice messages, etc.) between users and their contacts.

BACKGROUND

In the information age, users have seemingly limitless access to information about a variety of topics. For example, tablet computers, mobile telephones, portable digital assistants (PDAs), laptop computers, and other user devices may be used to provide a user with access to content such as news articles, blogs, electronic books, advertisements, emails, text messages, websites, and other sources of content. At the same time, users often enjoying sharing information they have come across with their contacts.

BRIEF SUMMARY OF EXAMPLE EMBODIMENTS

Accordingly, it may be desirable to provide tools that allow users of electronic devices to quickly and easily connect to their contacts to exchange communications (e.g., emails, text messages, voice messages, social media messages, telephone conversations). Embodiments of an apparatus, method, and computer program product are thus described that can present a user with content (e.g., a news article) and can further provide the user with one or more contacts that are associated with certain keywords derived from the content so as to enable the user to connect with the associated contact(s) to exchange communications, without requiring the user to leave the user interface presenting the content.

In some embodiments, an apparatus may be provided that includes at least one processor and at least one memory including computer program code. The at least one memory and the computer program code may be configured to, with the processor, cause the apparatus to at least identify at least one keyword relating to content presented to a user via a user interface, determine a contact associated with the keyword identified, and cause a communication to be exchanged between the user and the contact identified in response to receipt of a communication input provided by the user, wherein the communication input is received via the user interface presenting the content.

In some cases, the at least one memory and the computer program code may be configured to, with the processor, cause the apparatus to provide for presentation of a selectable element on the user interface, wherein input received via the selectable element causes the contact associated with the keyword identified to be displayed. The communication input may be received via the contact displayed, and/or the communication input may be received via the content presented. In some embodiments, the at least one memory and the computer program code may be configured to, with the processor, cause the apparatus to cause the communication to be exchanged via email, text message, phone call, or voice message. Moreover, the contact may be associated with the keyword identified based on a frequency of related words in prior communications between the user and the contact. Alternatively or additionally, the contact may be associated with the keyword identified based on a profile of the contact.

In other embodiments, a method and a computer program product are described for providing connections to contacts based on associations with content by identifying at least one keyword relating to content presented to a user via a user interface; determining a contact associated with the keyword identified; and causing a communication to be exchanged between the user and the contact identified in response to receipt of a communication input provided by the user, wherein the communication input is received via the user interface presenting the content.

The method and computer program may include providing for presentation of a selectable element on the user interface, wherein input received via the selectable element causes the contact associated with the keyword identified to be displayed. In some cases, the communication input may be received via the contact displayed. In other cases, the communication input may be received via the content presented.

The communication may be exchanged via email, text message, phone call, or voice message, among others. In some embodiments, the contact may be associated with the keyword identified based on a frequency of related words in prior communications between the user and the contact. Additionally or alternatively, the contact may be associated with the keyword identified based on a profile of the contact.

In still other embodiments, an apparatus is provided for providing connections to contacts based on associations with content. The apparatus may include means for identifying at least one keyword relating to content presented to a user via a user interface; means for determining a contact associated with the keyword identified; and means for causing a communication to be exchanged between the user and the contact identified in response to receipt of a communication input provided by the user, wherein the communication input is received via the user interface presenting the content.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

DETAILED DESCRIPTION

Figure 1:
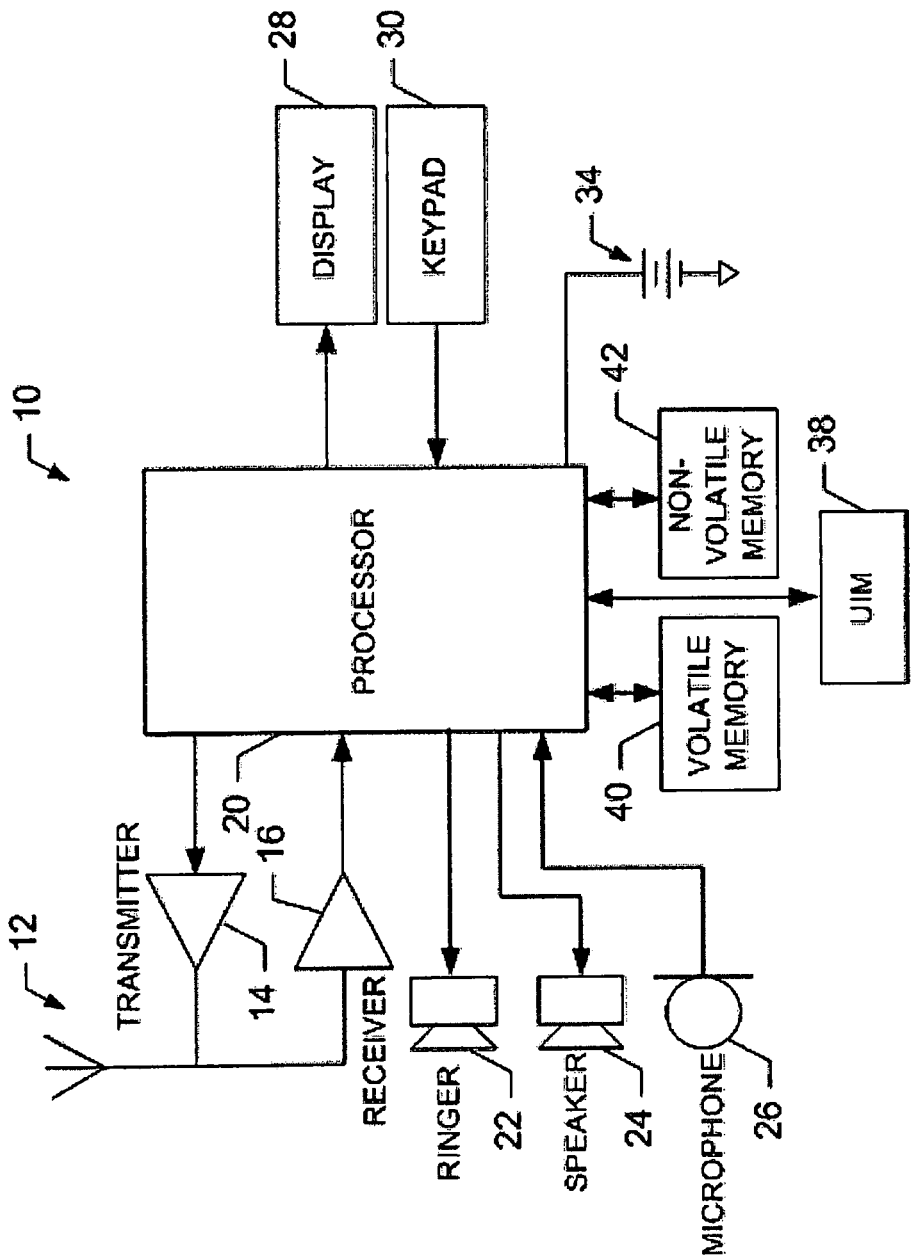
FIG. 1 illustrates one example of a communication system according to an example embodiment of the present invention.

Some example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, users have grown accustomed to consuming content on their user devices. In the process of consuming content, the user may be reminded of a contact (e.g., a person with whom the user has exchanged communications in the past or who the user anticipates exchanging communications, such as a user of another user device) and may desire to share information with that contact.

For example, the user may be reading a news article about an earthquake in the Sichuan province of China and may think of a friend who has family living in that area of China. The user may want to reach out to the friend to inquire about the friend's family and see if there is anything the user can do to help the friend or the friend's family.

Conventional methods of communication would require the user to exit from or temporarily close or minimize the application via which the user was consuming the information (e.g., the web browser) and open or enter another application (e.g., an email or texting application). The user would then have to locate the name of the friend the user has thought of (e.g., from a list of all of the user's contacts) and draft a communication to be sent to the contact.

Thus, according to conventional methods, the user must interact with the user device multiple times (e.g., to exit out of one application, open another application, locate the contact, draft the communication, etc.). In addition, the user may, in the process of switching between applications, inadvertently lose the first application via which the content was being provided (e.g., by accidentally closing the application instead of minimizing the application), lose his or her place within the application (such that the user may have to re-read certain portions of the content to recall where he or she left off), or, at the very least, be distracted such that the user's enjoyment of the content is diminished. In some cases, the trouble to the user of preparing and sending the communication to the contact in the conventional way may discourage the user from establishing the connection at all, and the user may simply continue consuming the content, ignoring his or her desire to reach out to the friend.

Accordingly, example embodiments of the present invention provide mechanisms for determining a contact associated with a keyword relating to content being consumed by the user and allowing the user to exchange a communication with the contact determined via the same user interface presenting the content.

Turning now to FIG. 1, which provides one example embodiment, a block diagram of a mobile terminal 10 that would benefit from embodiments of the present invention is illustrated. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

An example embodiment of the invention will now be described with reference to FIG. 2, which depicts certain elements of an apparatus 50 for determining a contact associated with keywords of content presented to a user for enabling communication with the contact. The apparatus 50 of FIG. 2 may be employed, for example, with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile telephone, or other user terminal. Moreover, in some cases, part or all of the apparatus 50 may be on a fixed device such as a server or other service platform and the content may be presented (e.g., via a server/client relationship) on a remote device such as a user terminal (e.g., the mobile terminal 10) based on processing that occurs at the fixed device.

Figure 2:
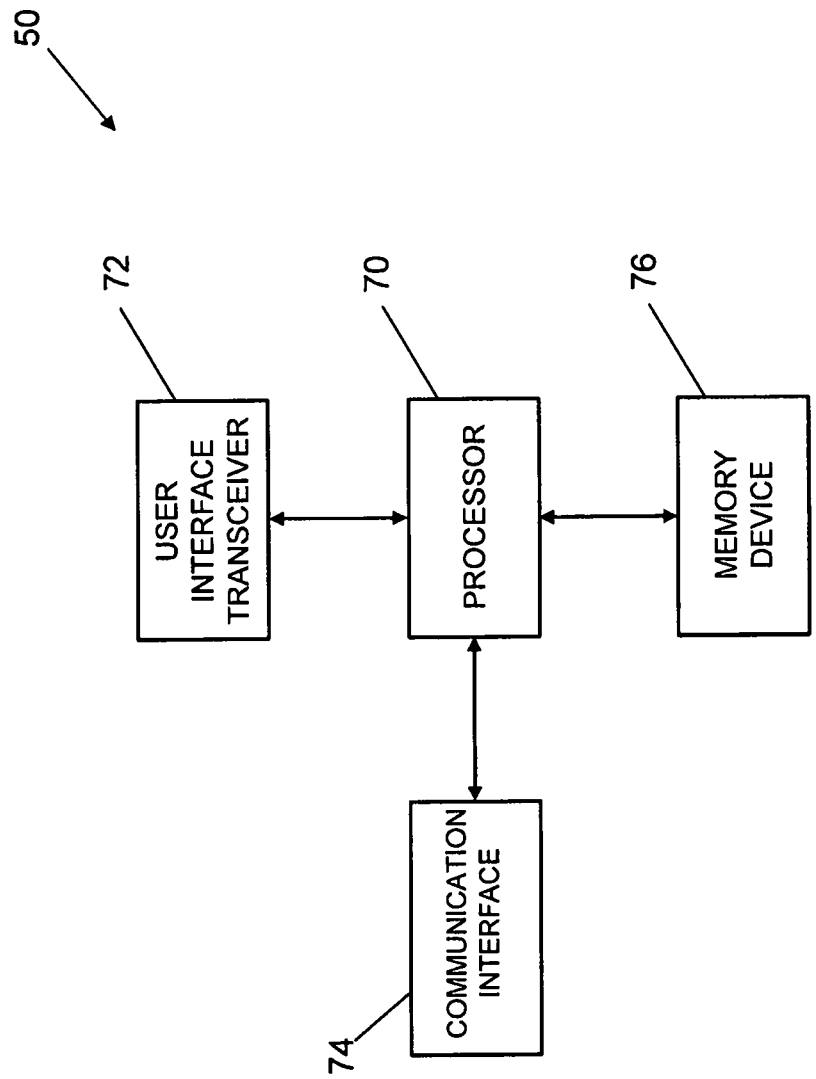
FIG. 2 illustrates a schematic block diagram of an apparatus for determining contacts associated with content and enabling communication with the contacts according to an example embodiment of the present invention.

It should also be noted that while FIG. 2 illustrates one example of a configuration of an apparatus 50 for determining a contact associated with keywords of content presented to a user for enabling communication with the contact, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

Figure 3:
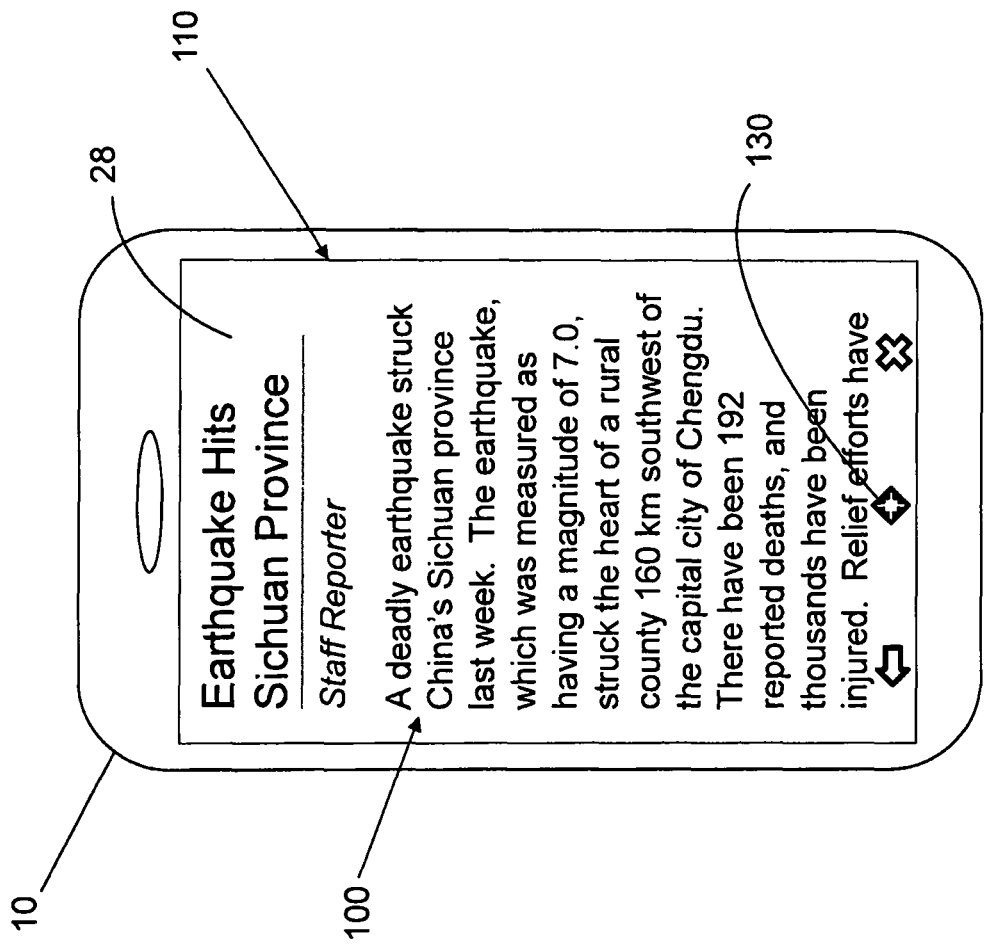
FIG. 3 illustrates a user interface for providing content to a user according to an example embodiment of the present invention.

Turning now to FIG. 3, in general, an apparatus 50 (shown in FIG. 2) is provided, such as an apparatus embodied by the mobile terminal 10 of FIG. 1 (e.g., a cellular phone) that has or is otherwise associated with a display 28, such as a touch screen display. As described above, the apparatus may comprise at least one processor (e.g., processor 70 of FIG. 2) and at least one memory (e.g., memory device 76 of FIG. 2) including computer program code. The at least one memory and the computer program code may be configured to, with the processor, cause the apparatus to identify at least one keyword relating to content presented to a user via a user interface, determine a contact associated with the keyword identified, and cause a communication to be exchanged between the user and the contact determined in response to receipt of a communication input provided by the user. The communication input may be received via the user interface presenting the content, as described in greater detail below.

In FIG. 3, for example, content 100 may be presented to the user via a user interface 110 generated on a display 28 of the user device (in this example, the mobile terminal 10). The user in this scenario, for example, is reading content 100 in the form of an article about an earthquake in the Sichuan province of China. Although the content 100 in this example is a news article (e.g., an article posted on the Internet), the content could be a number of other types of content, such as a website, an email, a text message, a blog posting, etc.

Continuing with the example illustrated in FIG. 3, the apparatus may be caused (e.g., via the processor) to identify at least one keyword relating to the content 100 that is presented. The keyword, for example, may be a word found in the metadata associated with the content (e.g., a meta tag describing the content). In the depicted embodiment, meta tags associated with the content (e.g., as defined by the content provider, so as to allow a search engine to locate the content in response to search criteria provided by the user) may include the terms "earthquake" and "Sichuan," among other terms. In other cases, the keyword may be a certain type of word, such as a location (e.g., "China" or "Sichuan"); a technical term or a term associated with a particular field of expertise (e.g., "nitrous oxide" or "ozone"); a trademark, service mark, or trade name (e.g., "Adidas" or "Nokia"); an event (e.g., "earthquake," "shooting," "World Cup"); etc. In still other cases, the keyword may be a word that appears with a certain frequency in the content (e.g., a higher frequency relative to other words) or in a certain location (e.g., in the title of the content). In some embodiments, keywords may be identified by identifying a location based on a time zone or area code associated with the content. The content date may, in some cases, be a keyword that is identified and determined to be associated with a contact (e.g., a birthday). In the depicted example of FIG. 3, one of the keywords identified may thus be the word "Sichuan."

In some embodiments, analysis of the content 100 may occur in stages. For example, certain types of keywords, such as keywords relating to the event described by the content, may initially be detected. Upon detection of these initial keywords, other keywords may be extracted from the content 100. For example, in the embodiment depicted in FIG. 3, the keyword "earthquake" may be initially detected (e.g., through metadata associated with the content), and upon detection of this keyword, the location of the event (e.g., where the earthquake took place) may be identified as an additional keyword (in this case, "Sichuan province" or "China").

A contact may then be determined, where the contact is associated with the keyword identified. The contact may be associated with the keyword (or keywords) in various ways. For example, the contact may be a person in the user's contact list or address book who was born in the location identified as a keyword, lived there, or has family living there. In the case of a keyword that is related to a certain field of expertise, the contact may be associated to the keyword in an instance in which the contact works in the same field (e.g., based on the contact's job title, education, place of employment, field of interest, etc.). A contact may be associated with a keyword that is a trademark, service mark, or trade name as a result of the contact's place of employment, interests, or previous communications with the user (described below). Furthermore, a contact may be associated with a keyword that is an event (such as "earthquake") in a case where the contact has experienced a similar event or has expressed interest in such events.

Figure 4:
FIG. 4 illustrates a contact's profile according to an example embodiment of the present invention.

In some embodiments, for example, a user's contact may be associated with a keyword that is identified based on a profile of the contact. Turning to FIG. 4, for example, a particular contact of the user ("Mike" in the depicted example) may have information in his profile 120 (e.g., in the form of notes entered by the user) indicating that Mike was born in the Sichuan province of China. As a result, the contact Mike may be associated with keywords such as Sichuan and China. Based on his profile, the contact Mike may be associated with other keywords, as well, such as "children" (Mike has two kids), "Innotech" (Mike works at Innotech Industries), "Big City" and "Illinois" (Mike lives in or near Big City, Ill.), "World Cup" (Mike enjoys soccer), "Mozart" (Mike listens to classical music), etc. Moreover, a service (e.g., the user's or contact's mobile phone service provider) may derive keywords to be associated with the contact from information provided in the contact's profile. For example, the service may determine the location of a particular contact based on the location of the server(s) the contact is using to send messages, access the Internet, place telephone calls, etc. The service may also analyze the telephone number of the contact and determine the location of the phone number (e.g., based on the area code). Such locations may then be associated with the contact by the service or another processor or service in communication with the service.

Alternatively or additionally, the contact may be associated with a keyword that is identified based on a frequency of related words in prior communications between the user and the contact. For example, the user may exchange (e.g., send and/or receive) messages (such as Short Message Service (SMS) messages, Social Network Service (SNS) messages, email messages, and so on) with a contact (e.g., Mike) on a regular basis. The contact and/or the user may use a particular service (e.g., a social networking website, mobile phone service provider, etc.) to send and receive the messages, and the service may be configured to analyze the messages, record certain keywords based on the content of the messages, and associate the keywords with the particular sender of the message (the user or the contact). For example, Mike may have a habit of sending his friend, the user, messages commenting about soccer stats, players, upcoming games, etc. In this case, the service Mike uses to send his messages to the user may recognize the term "soccer" as being a high frequency word and may record the term as a keyword and associate it with Mike. Moreover, in some embodiments, additional keywords may be associated with Mike as a result of the association of Mike with the term "soccer," such as "World Cup" and "David Beckham," for example, thereby adding a second level of associated keywords to the contact.

In still other embodiments, terms used in the contact's profile may be used to determine other keywords to be associated with the contact. For example, referring again to FIG. 4, the fact that the user has entered information in Mike's profile indicating that Mike is a chemist may be used (e.g., by a service, such as a mobile phone service provider) to obtain additional keywords that may also be associated with the contact. The service may, for example, access a dedicated server that contains relationships between terms describing a particular profession (e.g., "chemist") and terms relating to that profession (e.g., terms common to the field of chemistry in this example, such as "Material Safety Data Sheet," "acid," "organic," etc.). Such related terms may then also be associated with the contact.

Figure 5:
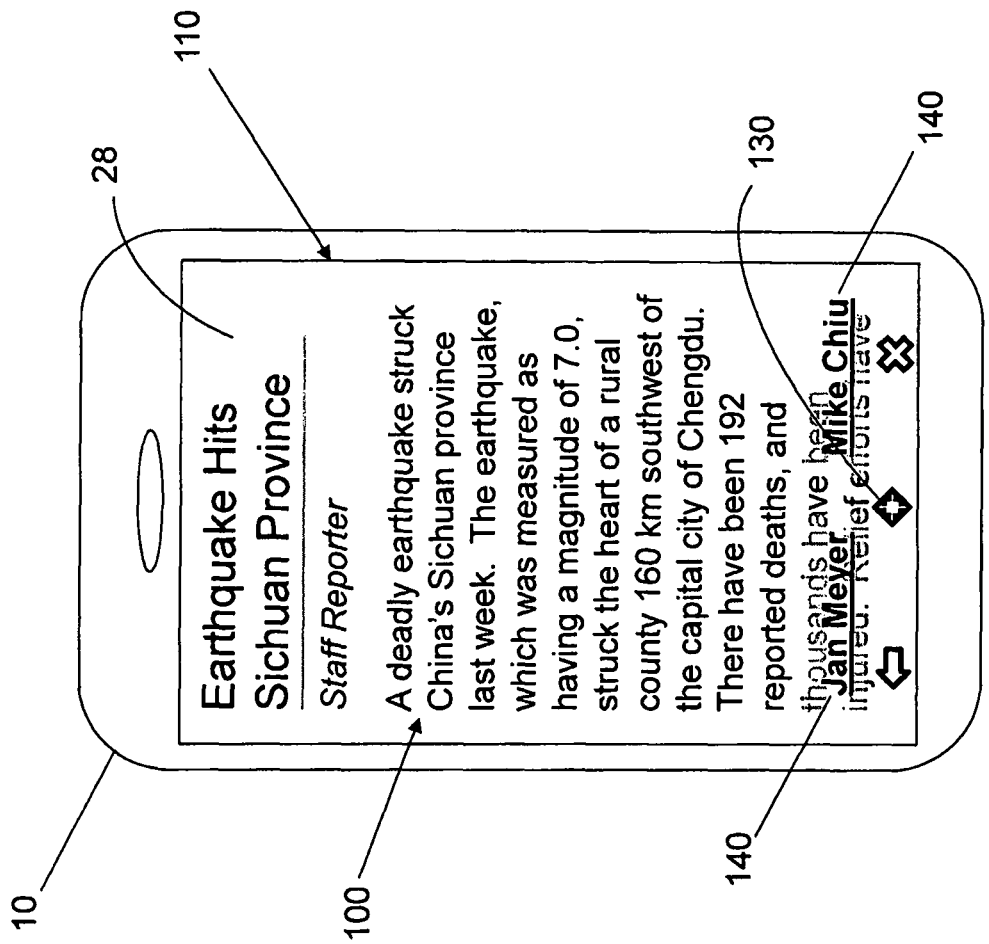
FIG. 5 illustrates contacts displayed on the user interface of FIG. 3 in response to receipt of input via a selectable element according to an example embodiment of the present invention.

Turning again to FIG. 3, in some embodiments, such as embodiments in which the display 28 is a touch display, the at least one memory and the computer program code may be configured to, with the processor, cause the apparatus to provide for presentation of a selectable element on the user interface 110, such as the selectable element 130. Input received via the selectable element 130 in such cases may cause the contact associated with the keyword identified to be displayed. For example, a user may tap the selectable element 130, and as a result, one or more contacts associated with the keyword (or keywords) identified may be shown on the user interface 110 concurrently with the content, as illustrated in FIG. 5. In FIG. 5, the contacts 140 are displayed for the user via display of each contact's name. In other embodiments, however, a picture of each associated contact (e.g., from the contact's profile), email address, telephone number, or other contact identifier may be displayed instead of or in addition to the contact's name. For example, in some embodiments, another contact identifier may be a link to a contact's social media account (e.g., Facebook® account, Google+ account, Twitter® application or website, etc.) where the user can enter a message directly to the contact.

As noted above, the user may provide the communication input via the user interface 110 to cause a communication to be exchanged between the user and the contact. In some embodiments, for example, the at least one memory and the computer program code may be configured to, with the processor, cause the communication to be exchanged by causing an email, text message, social media message, or voice message to be sent to the contact. Moreover, the keyword that is identified may, in some cases, be automatically included in the communication to the contact. For example, in a case where the keyword identified is "Sichuan" or "earthquake," the term "Sichuan" or "earthquake" may be used as a subject line in an email or inserted in an SMS message to the contact.

Figure 6:
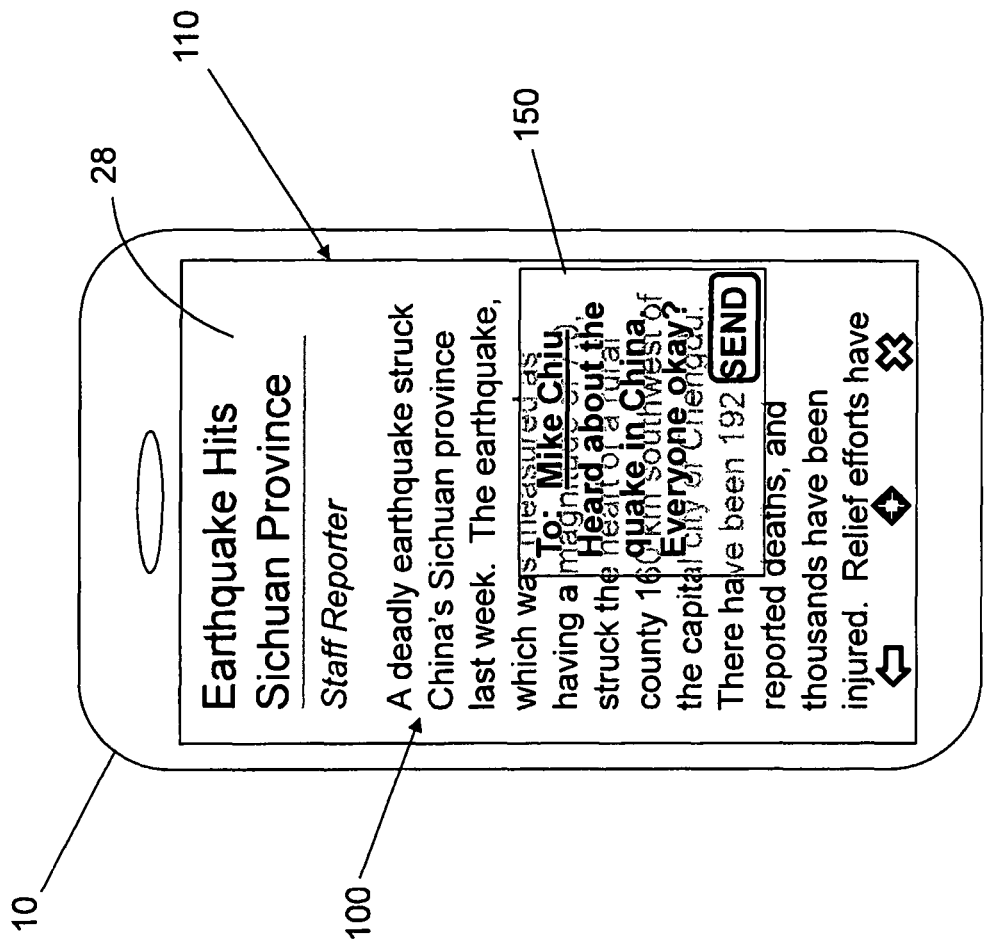
FIG. 6 illustrates a window for input of a message to be sent to a contact via the user interface of FIG. 3 according to an example embodiment of the present invention.

Continuing the example shown in FIG. 5, upon reviewing the one or more contacts 140 that are displayed as being associated with the keyword(s) identified (e.g., as a result of the input received via the selectable element), the user may find the contact with which the user would like to exchange a communication (e.g., the contact to which the user wishes to send a message). In the depicted example, the communication input may be received via the contact 140 displayed, such as via the user's selection (e.g., tapping) of the contact Mike Chiu. Selecting the displayed contact 140 Mike Chiu may in turn provide a window 150 for the user to input a message to be sent to the selected contact, as shown in FIG. 6. The window 150 may thus be presented in the same user interface 110 via which the content (e.g., the article about the earthquake) is presented to the user, such that the user does not need to exit from the first user interface presenting the content to open another, different user interface for creating and sending the message. Accordingly, the user can quickly and easily connect to a desired contact based on the contact's association with the content being consumed by the user without unnecessarily interrupting the user's consumption of the content (e.g., concurrently with the display of the content).

Figure 7:
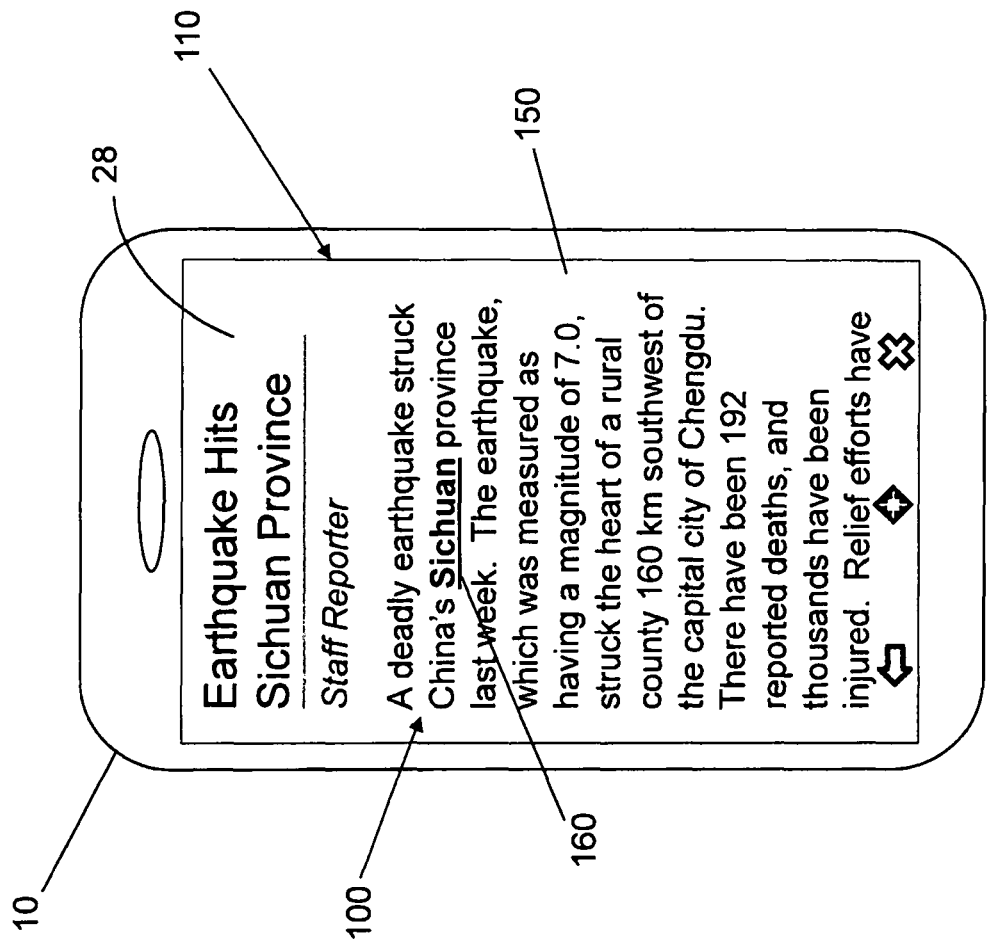
FIG. 7 illustrates a selectable element that is a keyword of the content according to an example embodiment of the present invention.

In some embodiments, the selectable element may be a portion of the content presented. For example, as shown in FIG. 7, one or more of the keywords 160 identified in the content may be highlighted or otherwise visually indicated to the user (e.g., using a different color, a different font, etc.), and the user may be able to see which contacts are associated with that particular keyword and connect to a particular determined contact by selecting the keyword (e.g., tapping the keyword). In this way, the communication input may be received via the content presented (e.g., via selection of the keyword identified and presented within the content). As another example, tapping the keyword in this example or other selectable element (as described above with reference to FIG. 5) may, in addition to displaying the associated contacts, also provide the user with options for the type of communication that may be exchanged. For example, a telephone icon and an SMS icon may be displayed, where the user's selection of the telephone icon would result in a phone call being placed to the contact and selection of the SMS icon would result in provision of an SMS window (such as the window 150 shown in FIG. 6) being provided for the user to create an SMS message to send to the contact.

Figure 8:
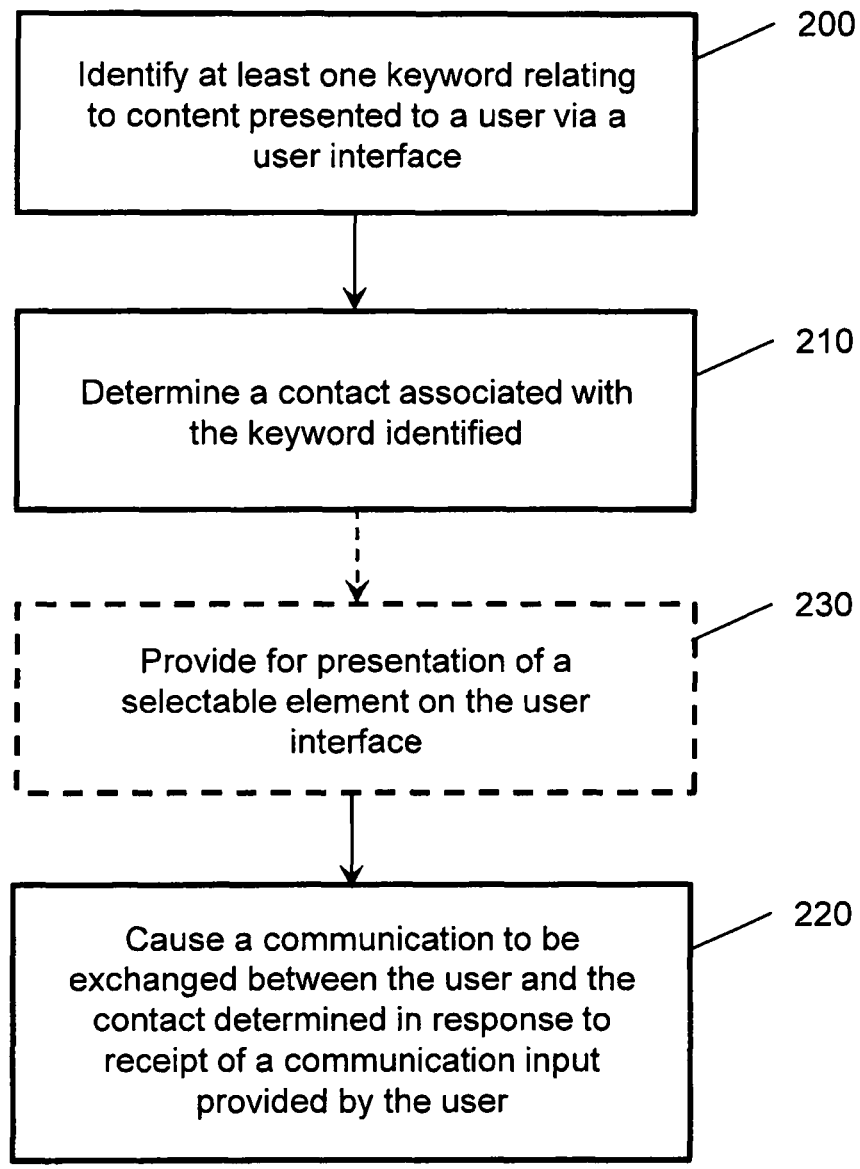
FIG. 8 illustrates a flowchart of methods of determining contacts associated with content and enabling communication with the contacts according to an example embodiment of the present invention.

FIG. 8 illustrates a flowchart of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an example embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one example embodiment of a method for determining a contact associated with keywords of content presented to a user for enabling communication with the contact is shown in FIG. 8. FIG. 8 depicts an example embodiment of the method that includes identifying at least one keyword relating to content presented to a user via a user interface at block 200, determining a contact associated with the keyword identified at block 210, and causing a communication to be exchanged between the user and the contact determined in response to receipt of a communication input provided by the user at block 220, where the communication input is received via the user interface presenting the content.

In some cases, a selectable element may be presented on the user interface at block 230, where input received via the selectable element causes the contact associated with the keyword identified to be displayed. The communication input may be received via the contact displayed. In other cases, the communication input may be received via the content presented, as described above.

Communication may be exchanged in some embodiments by causing an email, text message, social media message, or voice message to be sent to the contact determined. In this regard, the contact may be associated with the keyword identified based on a frequency of related words in prior communications between the user and the contact in some cases. In other cases, the contact may be associated with the keyword identified based on a profile of the contact.

In some embodiments, certain ones of the operations above may be modified or further amplified as described below. Furthermore, in some embodiments, additional optional operations may be included, some examples of which are shown in dashed lines in FIG. 8. Modifications, additions, or amplifications to the operations above may be performed in any order and in any combination.

In an example embodiment, an apparatus for performing the methods of FIG. 8 above may comprise a processor (e.g., the processor 70 of FIG. 2) configured to perform some or each of the operations (200-230) described above. The processor may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operation 200 may comprise, for example, the processor 70, the memory device 76, and/or a device or circuit for executing instructions or executing an algorithm for processing information as described above. Examples of means for performing operations 210 and 230 may comprise, for example, the user interface transceiver 72, the processor 70, the memory device 76, and/or a device or circuit for executing instructions or executing an algorithm for processing information as described above. Examples of means for performing operation 220 may comprise, for example, the user interface transceiver 72, the processor 70, communication interface 74, the memory device 76, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory comprising computer program code, the at least one memory and the computer program code configured to, with the processor, cause the apparatus to at least:
    identify, based at least on metadata associated with a content, a first keyword relating to the content, wherein the content is presented to a user via a user interface displaying a web browser application, and wherein the user interface includes a first selectable element associated with the first keyword;
    access a contact application to determine, based at least on a contact list of the user, a contact associated with the first keyword, wherein the contact is determined based at least on a correspondence between a first location associated with the contact and a second location associated with the content, and wherein the first location associated with the contact is determined based at least on a location of one or more servers used by the contact for communication;
    in response to receiving, via the user interface, a selection of the first selectable element associated with the first keyword, update the user interface to display a second selectable element associated with the contact associated with the first keyword; and
    in response to receiving, via the updated user interface, a selection of the second selectable element associated with the contact, generate a communication by at least inserting, in the communication, at least one of the first keyword associated with the contact or a second keyword related to the first keyword, and cause the communication including at least one of the first keyword or the second keyword to be exchanged between the user and the contact.

2. The apparatus of claim 1, wherein the at least one memory and the computer program code are configured to, with the processor, further cause the apparatus to at least:
    cause the communication to be exchanged via one or more of an email, a text message, a phone call, social media, or a voice message.

3. The apparatus of claim 1, wherein the contact is determined based at least on a frequency of the first keyword and/or the second keyword appearing in one or more prior communications between the user and the contact.

4. The apparatus of claim 1, wherein the contact is further determined based on a profile of the contact.

5. The apparatus of claim 1, wherein the content comprises a news article or a blog post.

6. The apparatus of claim 1, wherein the communication is generated by at least inserting, in a subject line of the communication, the first keyword and/or the second keyword.

7. The apparatus of claim 1, wherein the first location associated with the contact is further determined based on a telephone number associated with the contact.

8. A method, comprising:
    identifying, based at least on metadata associated with a content, a first keyword relating to the content, wherein the content is presented to a user via a user interface displaying a web browser application, and wherein the user interface includes a first selectable element associated with the first keyword;
    accessing a contact application to determine, based at least on a contact list of the user, a contact associated with the first keyword, wherein the contact is determined based at least on a correspondence between a first location associated with the contact and a second location associated with the content, and wherein the first location associated with the contact is determined based at least on a location of one or more servers used by the contact for communication;
    in response to receiving, via the user interface, a selection of the first selectable element associated with the first keyword, updating the user interface to display a second selectable element associated with the contact associated with the first keyword;
    in response to receiving, via the updated user interface, a selection of the second selectable element associated with the contact, generating a communication by at least inserting, in the communication, at least one of the first keyword associated with the contact or a second keyword related to the first keyword, and causing the communication including at least one of the first keyword or the second keyword to be exchanged between the user and the contact.

9. The method of claim 8, wherein the communication is exchanged via one or more of an email, a text message, a phone call, social media, or a voice message.

10. The method of claim 8, wherein the contact is determined based at least on a frequency of the first keyword and/or the second keyword appearing in one or more prior communications between the user and the contact.

11. The method of claim 8, wherein the contact is further determined based on a profile of the contact.

12. A computer program product comprising at least one computer-readable storage medium having computer-executable program code portions stored therein, the computer-executable program code portions comprising program code instructions for:

identifying, based at least on metadata associated with a content, a first keyword relating to the content, wherein the content is presented to a user via a user interface displaying a web browser application, and wherein the user interface includes a first selectable element associated with the first keyword;

accessing a contact application to determine, based at least on a contact list of the user, a contact associated with the first keyword, wherein the contact is determined based at least on a correspondence between a first location associated with the contact and a second location associated with the content, and wherein the first location associated with the contact is determined based at least on a location of one or more servers used by the contact for communication;

in response to receiving, via the user interface, a selection of the first selectable element associated with the first keyword, updating the user interface to display a second selectable element associated with the contact associated with the first keyword;

in response to receiving, via the updated user interface, a selection of the second selectable element associated with the contact, generating a communication by at least inserting, in the communication, at least one of the first keyword associated with the contact or a second keyword related to the first keyword, and causing the communication including at least one of the first keyword or the second keyword to be exchanged between the user and the contact.

13. The computer program product of claim 12, wherein the communication is exchanged via one or more of an email, a text message, a phone call, social media, or a voice message.

14. The computer program product of claim 12, wherein the contact is determined based at least on a frequency of the first key word and/or the second keyword appearing in one or more prior communications between the user and the contact.

15. The computer program product of claim 12, wherein the contact is further determined based on a profile of the contact.

* * * * *